United States Patent
Billmaier et al.

(10) Patent No.: US 9,547,709 B2
(45) Date of Patent: Jan. 17, 2017

(54) FILE UPLOAD BASED ON HASH VALUE COMPARISON

(75) Inventors: David P. Billmaier, Woodinville, WA (US); Jason C. Hall, Seattle, WA (US); Alexander C. Barclay, Seattle, WA (US); John M. Kellum, Seattle, WA (US); Henry H. Yamamoto, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 14/373,156

(22) PCT Filed: Apr. 16, 2012

(86) PCT No.: PCT/US2012/033792
§ 371 (c)(1),
(2), (4) Date: Jul. 18, 2014

(87) PCT Pub. No.: WO2013/158066
PCT Pub. Date: Oct. 24, 2013

(65) Prior Publication Data
US 2014/0358938 A1 Dec. 4, 2014

(51) Int. Cl.
*G06F 17/30* (2006.01)
*H04L 29/08* (2006.01)

(52) U.S. Cl.
CPC ... *G06F 17/30595* (2013.01); *G06F 17/30097* (2013.01); *H04L 67/10* (2013.01)

(58) Field of Classification Search
CPC .................. G06F 17/30961; G06F 17/30153; G06F 17/30097; G06F 17/30595; G06F 17/30
USPC .................................................. 707/600–899
See application file for complete search history.

(56) References Cited

U.S. PATENT DOCUMENTS

| | | | |
|---|---|---|---|
| 7,949,641 B1 | 5/2011 | Eatough | |
| 7,962,452 B2 | 6/2011 | Anglin | |
| 7,979,709 B2 | 7/2011 | Takashima et al. | |
| 2003/0018581 A1 | 1/2003 | Bratton et al. | |
| 2005/0273592 A1 | 12/2005 | Pryor | |
| 2007/0150948 A1 | 6/2007 | Spiegeleer | |
| 2007/0180265 A1* | 8/2007 | Hiroshi | G06F 17/30067 713/187 |

(Continued)

FOREIGN PATENT DOCUMENTS

| CN | 1971745 | 5/2007 |
|---|---|---|
| CN | 101051307 | 10/2007 |

(Continued)

OTHER PUBLICATIONS

European Patent Office. Supplementary European Search Report. Application No. EP12874483. Date of mailing Oct. 28, 2015.

(Continued)

*Primary Examiner* — Isaac M Woo
(74) *Attorney, Agent, or Firm* — HP Inc. Patent Department

(57) ABSTRACT

A server determines whether a the stored on a computing device matches a file stored on the server by comparing hash values for a first portion of the files. Based on the comparing, the server determines whether to upload the first portion of the file. The server uploads second portion of the file. The server generates the file for download by appending the first portion of the file stored on the server to the second portion of the file uploaded from the computing device.

12 Claims, 5 Drawing Sheets

(56) References Cited

U.S. PATENT DOCUMENTS

| | | |
|---|---|---|
| 2007/0250521 A1 | 10/2007 | Kaminski |
| 2008/0065630 A1 | 3/2008 | Luo et al. |
| 2008/0133446 A1 | 6/2008 | Dubnicki et al. |
| 2008/0294696 A1 | 11/2008 | Frandzel |
| 2008/0319995 A1 | 12/2008 | Alspector et al. |
| 2011/0087690 A1 | 4/2011 | Cairns |
| 2011/0122255 A1 | 5/2011 | Haritaoglu |
| 2011/0185149 A1 | 7/2011 | Gruhl et al. |
| 2012/0330887 A1* | 12/2012 | Young ............... G06F 17/30017 707/610 |

FOREIGN PATENT DOCUMENTS

| | | |
|---|---|---|
| CN | 101141476 | 3/2008 |
| CN | 101699822 | 4/2010 |
| CN | 102156727 A | 8/2011 |

OTHER PUBLICATIONS

International Preliminary Report on Patentability received in PCT Application No. PCT/US2012/033792, Oct. 30, 2014, 5 pages.
International Search Report & Written Opinion received in PCT Application No. PCT/US2012/033792, Jan. 2, 2013, 8 pages.

* cited by examiner

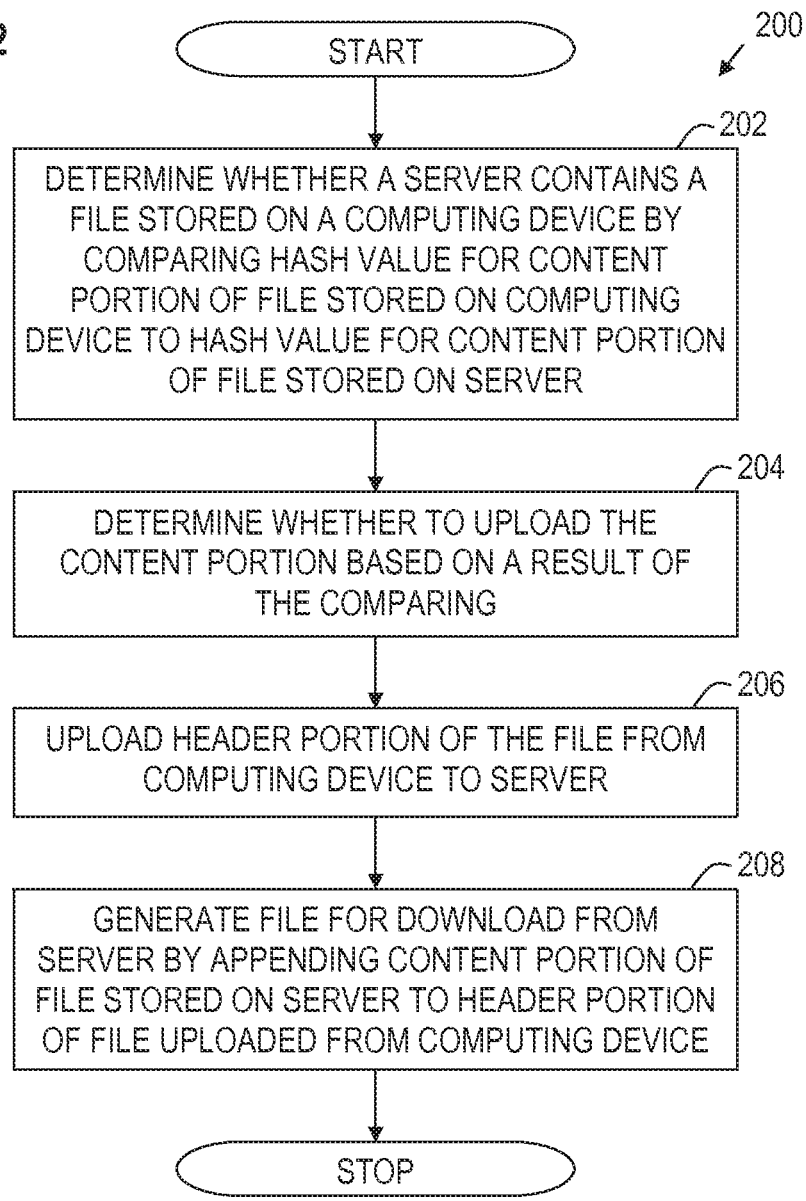

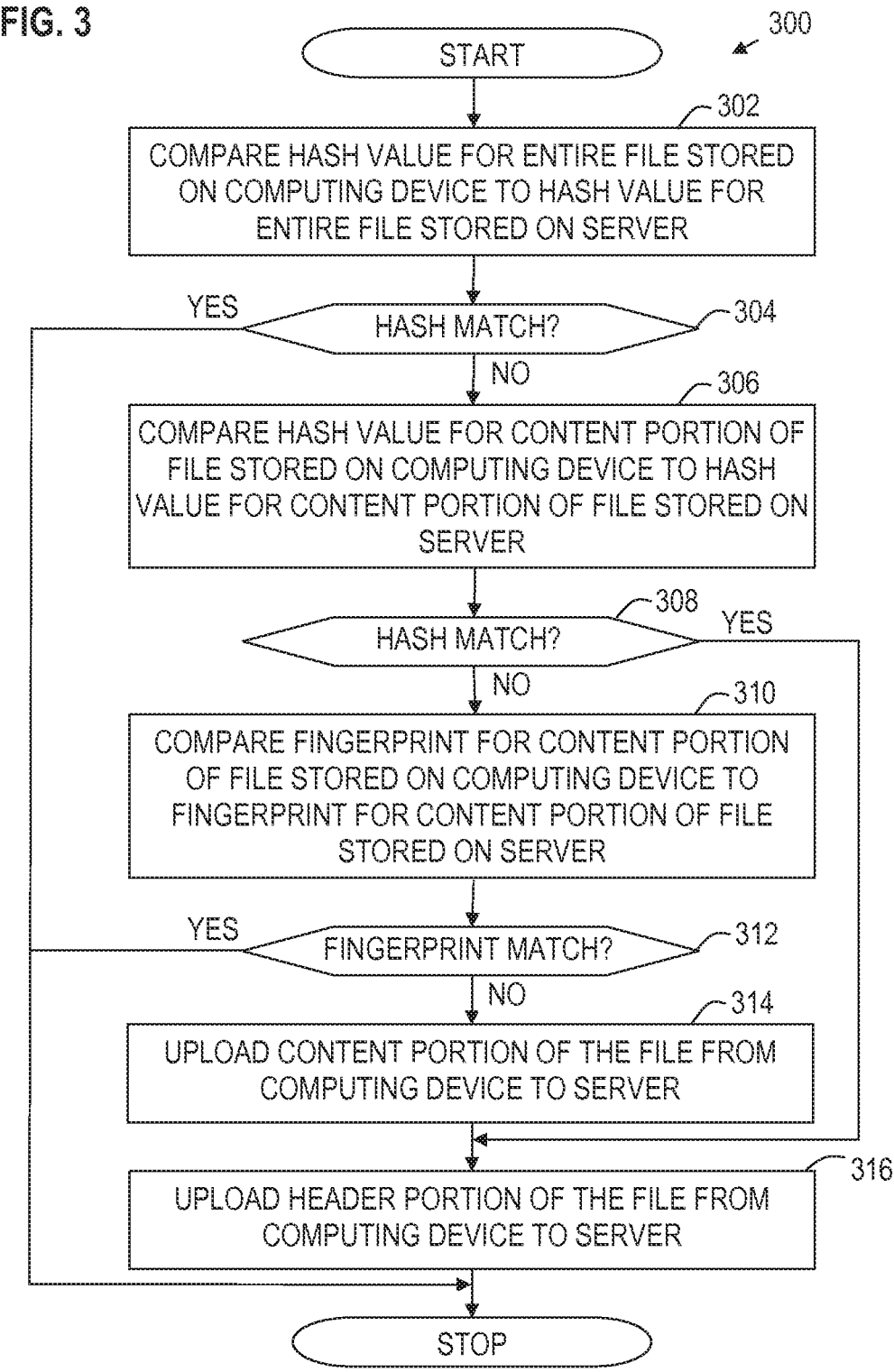

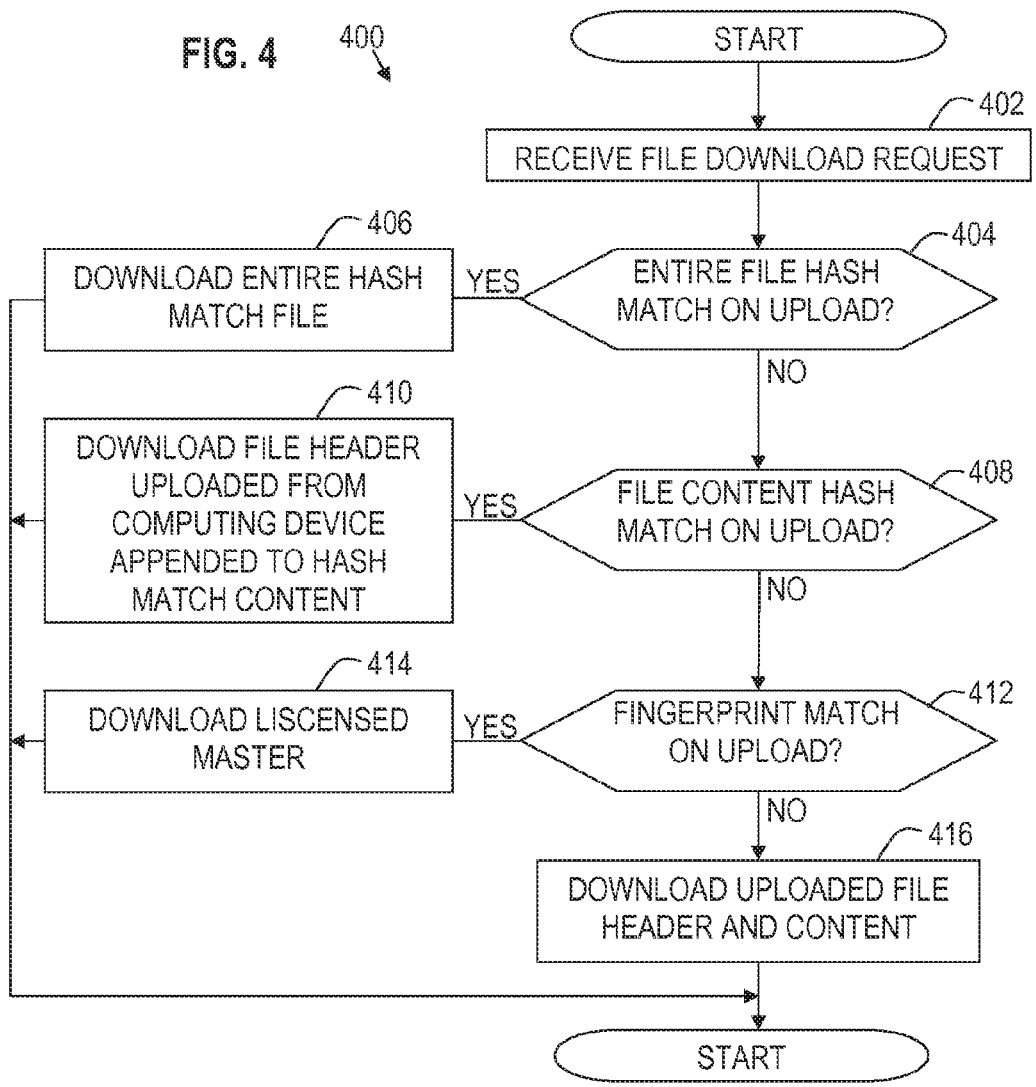

FILE UPLOAD BASED ON HASH VALUE COMPARISON

BACKGROUND

As users become acclimated to accessing their data via a variety of computing devices, it may be desirable to store a user's data files on a storage system that allows the files to be accessed from any of the user's devices and from any location via a network connection. Such distributed storage may be used to store relatively large media files, such music files or video files, that a user has an interest in accessing from multiple devices and/or locations, or has an interest in reducing the risk of file loss due to damage to localized storage. Consequently, the storage resources needed to store media and other files for a large number of users, and the network resources used to upload the files to distributed storage may be extensive.

BRIEF DESCRIPTION OF THE DRAWINGS

For a detailed description of various examples of the invention, reference will now be made to the accompanying drawings in which:

FIG. 2 shows a flow diagram for a method for storing and delivering files to remote computing devices in accordance with principles disclosed herein;

FIG. 3 shows a flow diagram for a method for uploading files to a server system in accordance with principles disclosed herein; and FIG. 4 shows a flow diagram for a method for delivering files to remote computing devices in accordance with principles disclosed herein.

NOTATION AND NOMENCLATURE

Figure 1A:
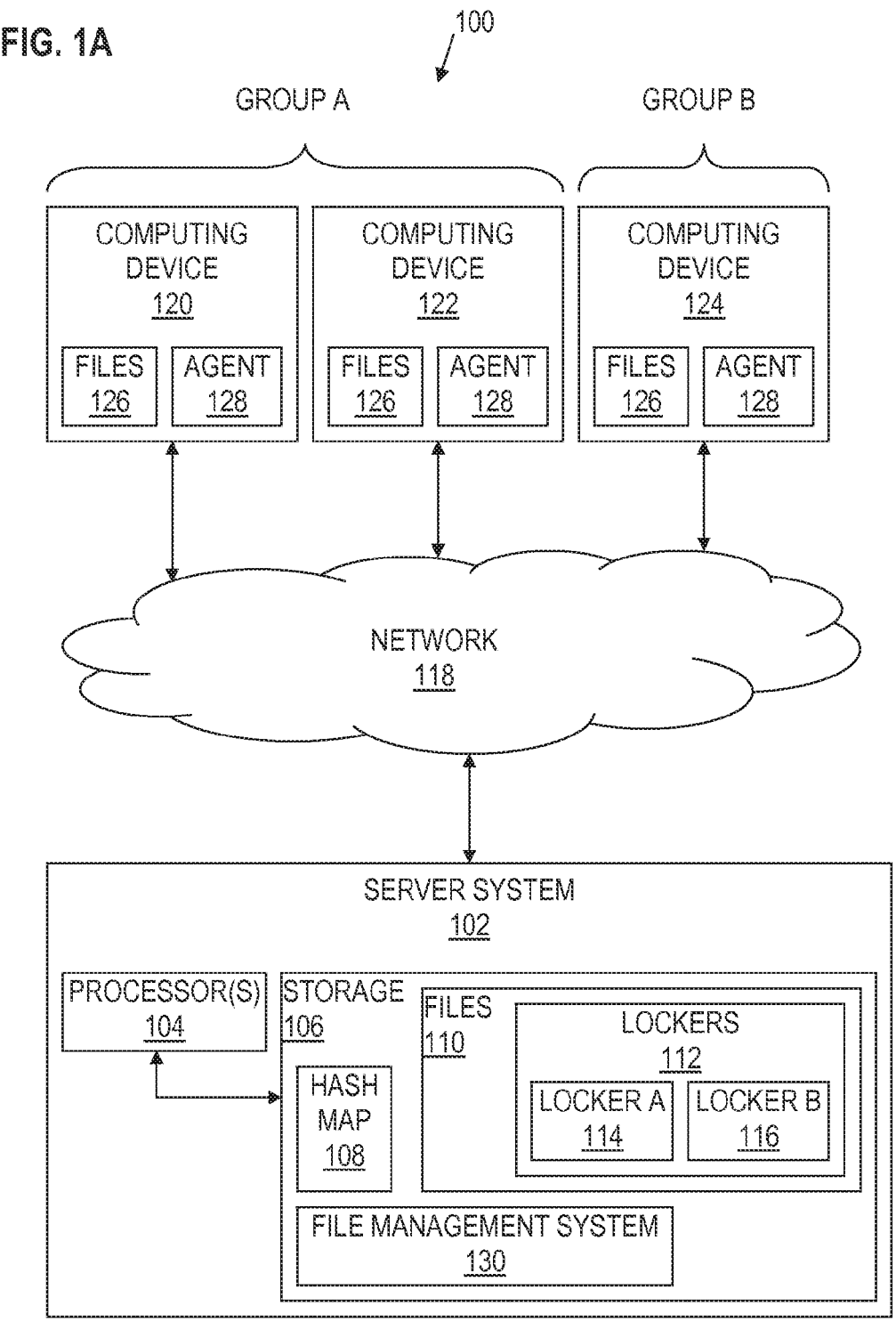
FIG. 1A shows a block diagram for a system for storing and delivering files to remote computing devices in accordance with principles disclosed herein.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical connection, or through a wireless electrical connection. Further, the term "software" includes any executable instructions capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

The following discussion is directed to various examples of a distributed storage system that uses hash value comparison to reduce the number of files stored on the system. The examples disclosed should not be interpreted, or otherwise used, as limiting the scope of the disclosure, including the claims. In addition, one skilled in the art will understand that the following description has broad application, and the discussion of any example is not intended to intimate that the scope of the disclosure, including the claims, is limited to that example.

Because a distributed storage system may be used to store large files, such as media files, for a large number (e.g., millions) of users, it is desirable to reduce the number of files stored by and/or transferred to the storage system without reducing the amount of content stored on the system. The distributed storage systems disclosed herein compare a hash value computed for a content portion of a user owned to file to hash values computed for storage system stored files to determine whether a file matching (e.g., is identical to) the user owned file is already stored on the storage system. If the hash value comparison identifies a matching file on the storage system, then the user owned file need not be uploaded to the storage system, reducing the storage and bandwidth consumed by the system.

The hash values may be based on a hash of the encoded symbols of the files (e.g., MP3 encoded, MPEG-4 encoding, etc.). If the hash value comparison fails to identify a matching file on the storage system, then a fingerprint of the content portion (e.g., the audio or video portion) of the user owned file may be compared to the fingerprints licensed master files stored on the distributed storage system. The fingerprints are indicia based on the decoded the signals (i.e., audio signals, video signals, etc.). For example, because playback of different encodings of an audio signal may produce equivalent audio perceptions, an audio fingerprint may be based on the how the audio signal is perceived by a hearer rather than signal encodings. Consequently, the fingerprints are not affected by differences in encoding formats, bit rates, coding errors, etc. that may cause hash value miscomparison. MUSICID by GRACENOTE. Inc. is one example of an audio fingerprinting system. However, fingerprinting the files can entail undesirable licensing expense that the hash comparison avoids. If the fingerprint comparison identifies an equivalent file on the storage system, then the user owned file need not be uploaded to the storage system, otherwise, the user owned file is uploaded to the storage system.

FIG. 1A shows a block diagram for a system 100 for storing and delivering files to remote computing devices in accordance with principles disclosed herein. The system 100 includes a server system 102, computing devices 120-124, and a network 118 that communicatively couples the server system 102 to the computing devices 120-124. The computing device 120-124 may operate as clients of the server system 102. The network 118 any network capable of communicatively coupling the computing devices 120-124 to the server system 102. For example, the network 118 may be a local area network, a wide area network, a metropolitan area network, the internet, or a combination thereof.

The computing devices 120-124 may be any type of computing device capable of transferring a file to and/or from the server system 100 via the network 118. For example, the computing devices 120-124 may be personal computers, wireless telephones, personal music players, gaming systems, tablet computers, etc. Computing devices 120 and 122 are associated as Group A, and computing device 124 forms Group B. Each of the devices forming a group may be associated with a common user (e.g., commonly owned). Thus, computing devices 120 and 122 may be associated with a user A, while computing device 124 is associated with user B. While three computing devices 120-124 are shown in FIG. 1A for illustrative purposes, in practice, the system 100 may include any number of such computing devices. Each computing device 120-124 includes files 126 and an agent 128.

The files 126 may be media or other files transferable to or from the server system 128. A file of the files 126 may include a content portion and a header portion. The content portion may contain media information (e.g., audio and/or video) of the file. The header portion may contain metadata that describes or provides information relevant to the content portion of the file (e.g., related artwork, title information, etc).

The agent 128 performs functions associated with the transfer of files to the server system 102. For example, the agent 128 may apply a hash function to the entirety of or the content portion of one of the files 126 and provide the hash value (also known as a hash key) to the server system 102. Application of the hash function to a portion of a file 126 produces a fixed size output (e.g., a single value) representative of the portion of the file. The secure hash algorithm variants (SHA) and message digest algorithm 5 (MD5) as examples of hash functions that may be applied in various implementations to hash the file 126. The agent 128 may be implemented as a processor (not shown) executing instructions stored in a computer readable storage medium of the computing device 120-124.

The server system 102 includes one or more server computers including processor(s) 104 and storage 106. The processor(s) 104 may include, for example, one or more general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Processors applied to implement the agent 128 of the computing devices 120-124 may be equivalent to the processor(s) 104.

The storage 106 is a non-transitory computer-readable storage medium and may, include volatile storage such as random access memory, non-volatile storage (e.g., a hard drive, an optical storage device (e.g., CD or DVD), FLASH storage, read-only-memory), or combinations thereof. In some implementations of the server system 102, the storage 104 may be dispose proximate to the processor(s) 104. In other implementations, the storage 104 may remote from the processor(s) 104 and accessed via a network, such as the network 118.

The storage 106 contains a hash map 108, files 110, and a file management system 130. The files 110 include lockers 112 that contain files downloaded from the computing devices 120-124, identified as locker A 114 and locker B 116. Locker A 114 may be associated with the computing devices 120-122 of Group A, and locker B may be associated with computing device 124 of Group B. The files 110 also include files obtained from sources other than the computing devices 120-124 that may be downloadable to the computing devices 120-124. For example, the files 110 may include licensed master files distributed by a controlling entity such as copyright holder of the master files. The files 110 may include media files, such as music and/or video files. The hash map 108 includes hash values computed for each of the files 110. The hash values are computed by applying a hash function to at least a portion (e.g., a content portion) of each of the files 110. In some embodiments, the hash map 108 includes a hash value for the content portion of each file and a hash value for the entirety of each file (e.g., the header and content portions of each file).

The file management system 130 includes instructions that are executed by the processor(s) 104 to manage the files 110, compute the hash values of the hash map 108, and transfer files to and/or from the computing devices 120-124. The file management system 130 applies the hash map 108 to determine whether a file 126 stored on one of the computing devices 120-124 is among the files 110 stored by the server system 102. If a file 126 stored on one of the computing devices 120-124 is among the files 110 stored by the server system 102, then the file 126 need not be uploaded to the server system 102, thereby reducing the number of files that must be uploaded and stored on the server system 102.

Figure 1B:
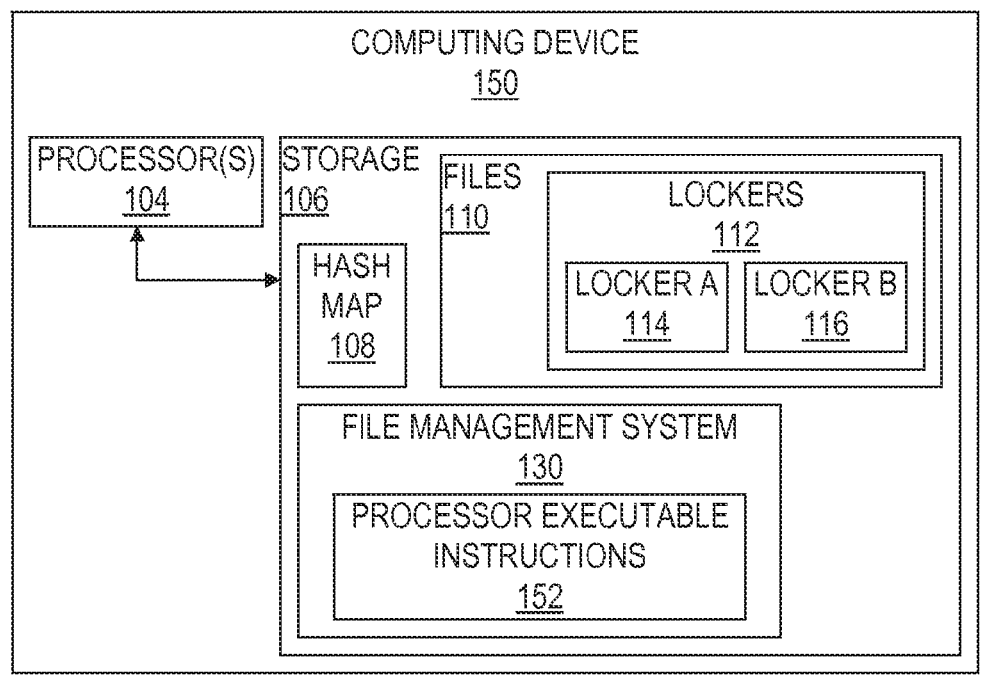
FIG. 1B shows a block diagram for a computing device usable for storing and delivering files in accordance with principles disclosed herein.

FIG. 1B shows a block diagram for a computing device 150 usable for storing and delivering files in accordance with principles disclosed herein. The computing device 150 may a component of the server system 102. The computing device 150 may be a desktop computer, a rack-mounted computer, or any other device capable of executing instructions for performing the operations disclosed herein. The computing device 150 includes one or more processors 104 as described herein and storage 106 as described herein. The storage 106 includes processor executable instructions 152 that when executed by the processor(s) 104 cause the processor(s) 104 to perform the various file management operations described herein.

FIG. 2 shows a flow diagram for a method 200 for storing and delivering files 110 to remote computing devices 120-124 in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 200 can be performed by the processor(s) 104 executing instructions of the file management system 130 read from a computer-readable medium (e.g., storage 106).

In block 202, the server system 102 determines whether a content portion of a file 126 stored on the computing device 120 is already stored on the server system 102. The determination is made by comparing a hash value computed for the content portion of the file 126 on the computing device 120 to hash values for files 110 stored on the server system 102. At least some of the files 110 stored on the server system 102 may be uploaded from the computing device 124 or provided for use by an owner of the file content. In some implementations, the agent 128 may compute the hash value and transfer the hash value to the server system 102 via the network 118. The server system 102 may implement the comparison by accessing the hash map 108 to determine whether a content portion of one of the files 110 stored on the server system 102 matches (e.g., corresponds bit-to-bit) the content portion of the file 126 stored on the computing device 120.

In block 204, based on result of the hash value comparison, the server system 102 determines whether to upload the content portion of the file 126 from the computing device 120. If a match for the hash value of the content portion of the file 126 is found on the server system 102, then the server system 102 need not upload the content portion of the file 126 from the computing device 120 to the server system 102. Instead, the server system 102 identifies the content portion of a file already stored among the files 110 as downloadable to the computing devices 120-122 when file 126 is requested by the computing devices 120 or 122. Thus, the server system 102 saves the network bandwidth and storage space that would have been used to transfer and store the content portion of the file 126 if uploaded. In some implementations the server system 102 may upload the file 126 but not store the file 126 among the files 110 based on identification of hash match. For example, the server system 102 may upload the file 126 of the content portion thereof and compute the hash value for the content portion, identify a hash match, and delete the uploaded file 126.

In block 206, the server system 102 uploads the header portion of the file 126 from the computing device 120, and stores the uploaded header portion of the file 126 in locker A 114 which is allocated for Group A file storage.

In block 208, computing device 120 or computing device 122 of Group A requests download of the file 126 from the server system 102 to the requesting computing device. Downloading the file may include streaming of the file to the computing device, where streaming refers to download of the file at a rate that allows for playback of the content portion of the file without requiring that the entirety of the file be stored on the requesting computing device.

The server system 102 generates the file for download by concatenating the header portion of the file 126 that was uploaded from the computing device 120 and the content stored of a file previously stored on the server system 102 and found to match the content portion the file 126, which was not uploaded and/or stored in the files 110. Thus, the generated file matches the file 126 stored on the computing device 120, while not requiring upload and/or storage of at least the content portion of the file 126.

FIG. 3 shows a flow diagram for a method 300 for storing files in a server system 102 in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 300 can be performed by the processor(s) 104 executing instructions of the file management system 130 read from a computer-readable medium (e.g., storage 106).

In block 302, a computing device 120-124 (e.g., computing device 120) requests upload of a file (e.g., file 126) to the server system 102. The server system 102 determines whether a file 126 stored on the computing device 120 is currently stored in whole on the server system 102. The determination is made by comparing a hash value computed for the entirety (e.g., header and content portions) of the file 126 on the computing device 120 to hash values for files currently stored on the server system 102. In some implementations, the agent 128 may compute the hash value and transfer the hash value to the server system 102 via the network 118. In other implementations, the agent 128 may transfer the file 126 to the server system 102, and the server system 102 may compute the hash value for the file 126. The server system 102 may implement the whole file hash comparison by accessing the file hash values stored in the hash map 108 to determine whether a file stored on the server system 102 matches the file 126 stored on the computing device 120.

In block 304, if the server system 102 identifies a hash value match for the entire file 126, then the server system 102 may store information indicating such a match has been identified, information identifying the file 126, information identifying the hash value of the whole file 126 and the content portion of the file 126, and information indicating which file stored on the server system 102 hashes to a value matching the file hash value of the file 126.

In block 304, if the server system 102 fails to find a hash value match, then, in block 306, the server system 102 determines whether a content portion of file 126 stored on the computing device 120 is currently stored on the server system 102. The determination is made by comparing a hash value computed for the content portion of the file 126 on the computing device 120 to hash values for content portions of files currently stored on the server system 102. In some implementations, the agent 128 may compute the hash value and transfer the hash value to the server system 102 via the network 118. In other implementations, the agent 128 may transfer the content portion of the file 126 to the server system 102, and the server system 102 may compute the hash value for the content portion of the file 126. The server system 102 may implement the comparison by accessing content hash values stored in the hash map 108 to determine whether a content portion of a file currently stored on the server system 102 matches the content portion of the file 126 stored on the computing device 120.

In block 308, if the server system 102 identifies a hash match for the content portion of the file 126, then, the server system 102 may store information indicating such a match has been identified, information identifying the file 126, information identifying the hash value of the whole file 126 and/or the content portion of the file 126, and information indicating which file stored on the server system 102 includes a content portion that hashes to a value matching the content hash value of the file 126. In block 316, the server system uploads the header portion of the file 126 from the computing device 120, and stores the uploaded header portion in locker A 114 which is allocated for storage of files uploaded from the Group A computing devices 120-122.

If the server system 102 fails to identify a hash match for the content of the file 126 in block 308, then, in block 310, the server system 102 applies fingerprinting to determine whether the content portion of the file 126 is stored as a licensed master on the server system 102. A fingerprint of the content portion of the file 126 is computed and the server determines whether the fingerprint matches a fingerprint of a licensed master file stored on the server system 102. While the hash values compared to identify entire matching files or content portions of files are susceptible to coding errors, bit rate mismatches, etc, that result in failure to identify a match, the fingerprint matching may be based on the content itself making fingerprint matching less susceptible to matching errors. A variety of audio and video fingerprinting techniques are available.

In block 312, if the server system 102 identifies a fingerprint match, then, the server system 102 may store information indicating that such a match has been identified, information identifying the file 126, and information identifying the licensed master file that fingerprint matches the file 126.

In block 312, if the server system 102 fails to find a fingerprint match, then the server system 102 uploads the content portion of the file 126 from the computing device 120 in block 314, and uploads the header portion of the file 126 in block 316. Thus, the entire file 126 is uploaded. For example, the entire file 126 may be uploaded as a unit. The server system 102 may store the uploaded file 126 in the locker A 114 allocated to storage of files uploaded from the computing devices 120-122 of Group A. The server system 102 also stores information indicating that the entire file 126 was uploaded, identifying the file 126, the uploaded header and content, and the hash values of the whole and content portions of the file 126.

If the hash or fingerprint comparisons successfully identify a match, then the server system 102 need not upload and/or store the content portion and/or header portions of the file 126 of the computing device 120. Instead, the server system 102 identifies the portions of a file already stored among the files 110 as downloadable to the computing devices 120-122 when file 126 is requested by the computing devices 120 or 122. Thus, the server system 102 saves the network bandwidth and/or storage space that would have been used to transfer and/or store the file 126.

FIG. 4 shows a flow diagram for a method 400 for delivering files to remote computing devices 120-124 in accordance with principles disclosed herein. Though depicted sequentially as a matter of convenience, at least some of the actions shown can be performed in a different order and/or performed in parallel. Additionally, some implementations may perform only some of the actions shown. At least some of the operations of the method 300 can be performed by the processor(s) 104 executing instructions of the file management system 130 read from a computer-readable medium (e.g., storage 106).

In block 402 the server system 102 receives a file download request from a computing device 120, 122 of Group A. The download request may solicit transmittal of a file previously stored (e.g., file 126) on the server system 102 by a device of Group A to the requesting device (e.g., device 120). Downloading the file may include streaming of the file to the computing device 120, where streaming refers to download of the file at rate that allows for playback of the content portion of the file without requiring that the entirety of the file be stored on the requesting computing device 120.

In block 404, the server system 102 accesses file information recorded when the requested file 126 was uploaded or stored on the server system 102. If the file information indicates that when upload of the file 126 was requested a previously stored file having a hash value matching a hash value computed for the entirety of the file 126 to be uploaded was identified, then the previously stored file is downloaded to the computing device 120 as file 126 in block 406.

If, in block 404, the accessed file information indicates that no entire file hash match was identified in connection with the file 126 upload request, then, in block 408, the server system 102 determines whether a file content hash match was identified when upload of the file 126 was requested. If the file information indicates that when upload of the file 126 was requested a previously stored file included a content portion having a hash value matching a hash value computed for the content portion of the file 126 to be uploaded, then, in block 410, the server system 102 generates a file for download to the requesting device 120.

The server system 102 may generate the file for download by appending the content portion of a file, which was stored among the files of the server system 102 prior to the request to upload file 126, to the header portion of the file 126 that was uploaded from the computing device 120. Thus, the generated file may match the file 126 stored on the computing device 120 at the time the of the upload request, while not requiring upload and/or storage of the content portion of the file 126 on the server system 102. The generated file is downloaded to the requesting device 120 in block 410.

If, in block 408, the accessed file information indicates that no file content hash match was identified in connection with the file upload request, then, in block 412, the server system 102 determines whether a file content fingerprint match was identified when upload of the file 126 was requested. If the file information indicates that when upload of the file 126 was requested a licensed master file stored on the server system 102 was a fingerprint match for the content of the file 126, then, in block 414, the server system 102 downloads the licensed master file to the requesting device 120 as the file 126.

If, in block 412, the file information indicates that no fingerprint match was identified in connection with the file upload request, then, in block 416, the server system 102 determines that both the header and the content of the requested file 126 (i.e., the entirety of the file 126) were uploaded and stored on the server system 102 based on a previous upload request. Accordingly, the server system 102 downloads the stored file 126 to the requesting device 120 in block 416.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining, by a server, whether a first file stored on a first computing device matches a second file stored on the server by comparing a first hash value computed for a first portion of the first file to a second hash value computed for the first portion of the second file;
   determining, by the server, whether to upload the first portion of the first file based on a result of the comparing;
   uploading, by the server, a second portion of the first file, wherein the first portion and the second portion are non-overlapping;
   generating, by the server, the first file for download from the server by appending the first portion of the second file to the second portion of the first file responsive to a request for the first file to be downloaded from the server; and
   determining, by the server, whether the first file stored on a first computing device matches the second file stored on the server by comparing a third hash value computed for the entire first file to a fourth hash value computed for the entire second file;
   downloading, by the server, the entire second file to the computing device responsive to a request for the first file to be downloaded from the server.

2. The method of claim 1, further comprising identifying the first file as being downloadable from the server to the first computing device based on the first hash value matching the second hash value.

3. The method of claim 1, further comprising:
   comparing a fingerprint value computed for the first portion of the first file to a fingerprint value computed for a master file based on the first hash value differing from the second hash value; and
   uploading the first file to the server based on the first fingerprint value differing from the second fingerprint value.

4. The method of claim 1, wherein the generating is responsive to a request from a second computing device, and further comprising downloading the first file to the second computing device responsive to the request from the second computing device, wherein the second computing device is associated with the first computing device by common ownership.

5. The method of claim 1, wherein the second file is uploaded to the server from a second computing device that is not associated with the first computing device.

6. A computing device, comprising:
a processor to:
receive a content hash value corresponding to a content portion of a content file stored on a client device;
determine whether to upload the content portion of the content file to the computing device from the client device by comparing the content hash value to a plurality of stored hash values corresponding to content portions of files previously stored on the computing device;
identify the content portion of the content file as having bit-to-bit correspondence to a content portion of one of the files previously stored on the computing device based on the content hash value matching one of the plurality of stored hash values;
download the content portion of the one of the files previously stored on the computing device that has correspondence to the content portion of the content file responsive to a request for the content file to be downloaded;
receive a file hash value corresponding to a totality of the content file stored on a first client device;
determine whether to upload the content file entirely to the computing device from the first client device by comparing the file hash value to a plurality of stored hash values corresponding to files previously stored on the computing device;
identify the content file as having bit-to-bit correspondence to one of the files previously stored on the computing device based on the content hash value matching one of the plurality of stored hash values; and
download the one of the files previously stored on the computing device that has correspondence to the content file responsive to a request for the content file to be downloaded.

7. The computing device of claim 6, wherein the processor is further to:
receive a header portion of the content file from the client device, wherein the header portion and the content portion are nor-overlapping; and
prefix the received header portion to the content portion of the one of the files previously stored on the computing device that has correspondence to the content portion of the content file responsive to a request for the content file to be downloaded.

8. The computing device of claim 6, wherein the processor is further to:
determine whether a fingerprint for the content portion of the content corresponds to a fingerprint for a master file stored on the computing device responsive to the content hash value differing from each of the plurality of stored hash values; and
upload the content file to the computing device based on the fingerprint for the content portion not corresponding to a fingerprint for the master file stored on the computing device.

9. The computing device of claim 6, wherein the processor is further to download the content portion of the one of the files previously stored on the computing device that has correspondence to the content portion of the content file responsive to a request from a second client device, wherein the second client device is distinct from and associated by common ownership with the first client device.

10. The computing device of claim 6, wherein the processor is further to receive the content portion of the one of the files previously stored on the computing device that has correspondence to the content portion of the content file from a second client device not associated by common ownership with the first client device.

11. A non-transitory computer readable storage medium encoded with instructions that when executed cause a processor to:
receive a file hash value corresponding to a totality of a content file stored on a first client device;
determine whether to upload the content file entirely to a content server from the first client device by comparing the file hash value to a plurality of stored hash values corresponding to files previously stored on the content server;
identify the content file as having bit-to-bit correspondence to one of the files previously stored on the content server based on the content hash value matching one of the plurality of stored hash values;
responsive to a request from a requesting client device for the content file to be downloaded, download the one of the files previously stored on the content server that has correspondence to the content file to the requesting client device;
based on failure to identify the content file as having bit-to-bit correspondence to one of the files previously stored on the content server:
receive a content hash value corresponding to a content portion of a content file stored on a client device;
determine whether to upload the content portion of the content file to the content server from the client device by comparing the content hash value to a plurality of stored hash values corresponding to content portions of files previously stored on the content server;
identify the content portion of the content file as having bit-to-bit correspondence to a content portion of one of the files previously stored on the content server based on the content hash value matching one of the plurality of stored hash values;
receive a header portion of the content file from the client device, wherein the header portion and the content portion are non-overlapping; and
responsive to a request from a requesting client device for the content file to be downloaded, prefix the received header portion to the content portion of the one of the files previously stored on the content server that has correspondence to the content portion of the content file to form a composite file; and
download the composite file to the requesting client device.

12. The non-transitory computer readable storage medium of claim 11 further encoded with instructions that when executed cause a processor to:
based on failure to identify the content portion of the content file as having bit-to-bit correspondence to a content portion of one of the files previously stored on the content server:
compute a fingerprint of the content portion of the content file;
determine whether the content server contains a master having a fingerprint matching the fingerprint of the content portion of the content file;

identify the master file as downloadable to the client computing device based on the master file having a fingerprint matching the fingerprint of the content portion of the content file.

* * * * *

UNITED STATES PATENT AND TRADEMARK OFFICE
CERTIFICATE OF CORRECTION

PATENT NO. : 9,547,709 B2
APPLICATION NO. : 14/373156
DATED : January 17, 2017
INVENTOR(S) : David P. Billmaier et al.

Page 1 of 1

It is certified that error appears in the above-identified patent and that said Letters Patent is hereby corrected as shown below:

In Column 9, Line 47, in Claim 7, delete "nor" and insert -- non --, therefor.

In Column 9, Line 56, in Claim 8, delete "content" and insert -- content file --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*